May 19, 1936. E. E. ADAMS 2,041,449
AUTOMATIC HEATING PLANT FOR SOLID FUEL CONSUMPTION
Filed Aug. 20, 1935   2 Sheets-Sheet 2

Inventor
E. E. Adams

By Clarence A. O'Brien
Attorney

Patented May 19, 1936

2,041,449

UNITED STATES PATENT OFFICE 2,041,449

AUTOMATIC HEATING PLANT FOR SOLID FUEL CONSUMPTION

Earl E. Adams, East Helena, Mont.

Application August 20, 1935, Serial No. 37,076

1 Claim. (Cl. 110—33)

This invention relates to heating plants.

One of the primary objects of the invention is the construction of a furnace with a slanting grate a portion of which initially receives the fuel from where it shifts by gravity influenced by intermittent jarring to the area of combustion.

Another feature of the present invention is an adaptation of a mechanical and automatic means for intermittently jarring the grate to separate the ashes and causing the fuel to move to the combustion area of the grate.

With the foregoing and other objects in view, the invention consists of a novel construction, combination and arrangement of parts as will be hereinafter more specifically described and illustrated in the accompanying drawings wherein is disclosed a preferred embodiment of the invention, but it is to be understood that changes, variations and modifications may be resorted to without departing from the spirit of the claim hereunto appended.

In the drawings wherein like reference characters denote corresponding parts throughout the several views:

Figure 4 is a vertical section taken substantially on line 4—4 of Figure 2 and looking in the direction of the arrows.

Figure 1:
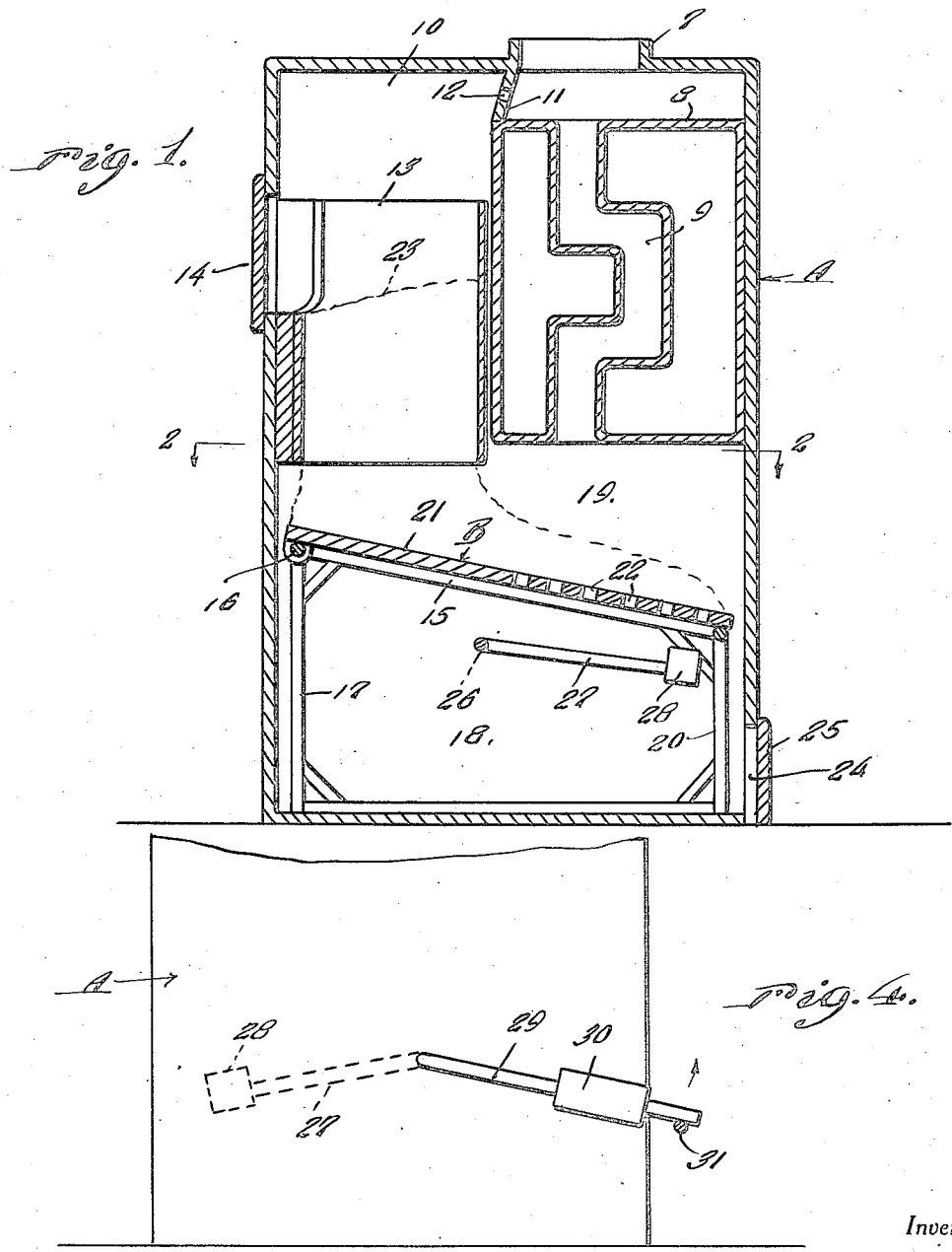
Figure 1 is a detailed vertical section through a furnace showing an adaptation therewith of the part of the present invention.
Figures 2, 3:
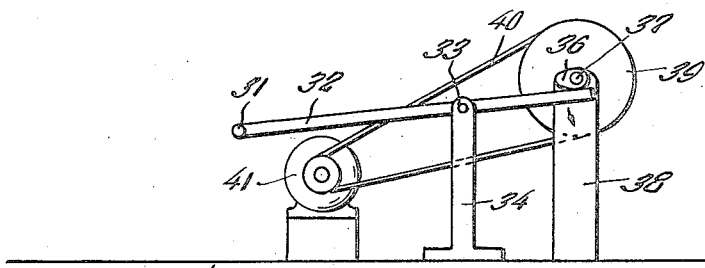
Figure 2 is a horizontal section taken substantially on the line 2—2 of Figure 1.
Figure 3 is a vertical section taken substantially on line 3—3 of Figure 2 and looking in the direction of the arrows.

Referring to the drawings in detail the heating plant showing the parts of the present invention applied thereto consists of a furnace indicated generally at A and this furnace is preferably rectangular in configuration although it is not specifically limited to this shape. Rising from the top wall of the furnace is a flue opening 7 from which the products of combustion may be carried through a suitable conductor to the chimney (not shown). Near the top and over the combustion area there is mounted the conventional water back 8 from where the water used in heating the building may be transferred to suitable conductors (not shown). The water back 8 may be adapted for heating the building with steam or hot water. Through the water back 8 in a vertical direction extends the flue passage 9 the lower end of which overlie with the combustion area of the grate and the upper end communicates with the flue 7.

On the same level with the water back is a fuel chamber 10. Between the fuel chamber 10 and the upper end of the water back is a partition wall 11 formed with an opening 12 to carry away smoke and gas to the flue 7. In the fuel chamber 10 is vertically supported an open bottom solid fuel container 13 preferably cylindrical in horizontal cross section. There is an opening in the furnace wall which communicates with the top of the fuel receptacle 13 and this opening is covered by a door 14. Fuel in the form of coal or cheap grades of fuel such as slack and sawdust is supplied to the fuel receptacle or hopper 13 through the door 14. Although I have shown a hopper or receptacle 13 for depositing solid fuel to be consumed it will be understood that any means may be used to deposit the coal on the upper or imperforate portion of the grate as will hereafter appear.

In the lower portion of the furnace A is disposed grate B which grate is substantially rectangular in configuration and conforms in shape to the inside of the furnace. The grate B is preferably formed of a cast iron panel, the bottom of which is secured to an open steel rectangular frame 15. The grate and frame when at rest are supported at an incline. At the upper end the grate and frame are pivoted as at 16 to an upright 17 at the rear of the ashpit chamber 18, the grate dividing the lower portion of the interior of the furnace into the ashpit and the firebox chamber 19 above the grate. The lower end of the grate and frame rests on the upright 20 in the ashpit 18.

The higher end 21 of the grate B is imperforate and lies under the open bottom of the fuel hopper or receptacle 13. The solid fuel from the receptacle or hopper initially is deposited on the higher imperforate end 21 of the grate from where it shifts by gravity and under the jarring influence to the lower end of the grate formed with a series of perforations 22 which may be of any shape desired. The solid fuel will be located in the dotted line position 23 as indicated in Figure 1. The solid fuel will burn on that portion of the grate where the perforations 22 appear and above the perforated lower end of the grate will be the combustion chamber, which chamber lies directly under the water back 8. There is considerable space between the inside walls of the furnace and the edges of the grate in the combustion area thereof so as to permit the ashes or spent coal to drop into the ashpit 18.

Forced draft may be introduced through the ashpit 18 by any suitable mechanical means (not shown) or natural draft may be supplied through the opening 24 controlled by the hinged door 25.

It is the purpose of the present invention to intermittently jar the inclined grate B to cause the coal deposited on the imperforate end 21 to shift by gravity down into the perforated area of the grate where it is consumed by combustion and for this purpose there is the hammer shaft 26 journaled across the ashpit 18 having the ends secured in bearings in the side walls of the furnace. Extending at right angles to the hammer shaft 26 and preferably formed integral therewith is a hammer arm 27 on the free end of which is the hammer head 28 and this hammer head is of considerable weight. Hammer head 28 at intermittent intervals rocks up and down and strikes the grate thereby jarring the grate and at the same time rocking the grate slightly on the pivot 16. Hammer shaft 26 extends through one side wall of the furnace and has a counterpoised crank arm 29 thereon. The weight 30 on the crank arm causes the said arm to maintain wiping engagement with a lateral extension 31 on the rockable arm 32. The rockable arm 32 is pivoted as at 33 to the upper end of a standard 34 resting on the floor 35. The other end of the rockable arm 32 is retained by the counter poised weight 30 in wiping engagement with a cam 36 on a drive shaft 37. The drive shaft 37 is supported on an upright 38 and mounted on this shaft is a pulley 39. The pulley 39 is driven by a belt 40 connected with a motor 41. Although I have shown a belt and pulley connection with the motor 41 gears may be used for imparting motion or translating motion from the motor to the shaft 37. In using forced draft in the furnace A it would be within the contemplation of the present invention to drive a fan with the motor 41 and supply forced draft through a conductor leading from the fan and connected with the ashpit 18.

It will be seen that when the motor 41 is in operation the rockable arm 32 causes the hammer shaft 26 to rock back and forth whereupon the hammer head 28 intermittently strikes the grate which action not only causes the solid fuel to shift downwardly from the imperforate portion of the grate to the perforate portion, but also causes the spent fuel such as cinders and ashes to drop into the ashpit from the combustion area of the grate.

Having thus described the invention, what is claimed as new is:

In a furnace construction, a solid fuel hopper, a swingable and normally inclined grate having its high end portion underlying the said hopper in substantial spaced relation with respect thereto, a swingable arm underlying the grate and provided with a weighted head engageable with the lower end of the grate, said grate being swingable from its upper end and means for moving the said arm so as to cause the head thereof to intermittently strike the bottom side of the grate.

EARL E. ADAMS.